United States Patent [19]

Guibert

[11] 4,269,169
[45] May 26, 1981

[54] CARTRIDGE FOR HOT AIR OVEN

[76] Inventor: Raul Guibert, 8343 W. 4th St., Los Angeles, Calif. 90048

[21] Appl. No.: 825,037

[22] Filed: Aug. 16, 1977

Related U.S. Application Data

[63] Continuation-in-part of Ser. No. 776,772, Mar. 11, 1977.

[51] Int. Cl.³ .................. B65D 21/00; F25B 13/00
[52] U.S. Cl. .................. 126/426; 126/21 A; 206/488; 206/499; 229/22; 312/326
[58] Field of Search .............. 206/499, 500, 45.18, 206/45.31, 460, 488, 489, 495; 229/22; 126/21 A, 246; 312/284, 326; 224/45 G, 48 F

[56] References Cited

U.S. PATENT DOCUMENTS

| | | | |
|---|---|---|---|
| 1,653,914 | 12/1927 | Keppler | 229/22 |
| 2,243,080 | 5/1941 | Brodgen | 229/22 |
| 2,801,742 | 6/1957 | Farrell | 206/499 |
| 2,893,550 | 7/1959 | Sandmeyer | 206/499 |
| 3,322,268 | 5/1967 | Larkin | 206/488 |
| 3,379,304 | 4/1968 | Mertz | 206/499 |
| 3,542,265 | 11/1970 | Peterson | 206/499 |
| 3,623,650 | 11/1971 | Watts | 229/22 |
| 3,968,551 | 10/1972 | Tomlinson | 206/489 |
| 3,987,894 | 10/1976 | Bidegain | 206/45.19 |
| 4,005,745 | 2/1977 | Colato | 312/236 |

FOREIGN PATENT DOCUMENTS 1257896  12/1971  United Kingdom ............ 312/236

Primary Examiner—George E. Lowrance
Attorney, Agent, or Firm—Michael Ebert

[57] ABSTRACT

A cartridge formed by a vertical stack of sealed trays nested within an open carton, the cartridge being used in conjunction with a hot-air oven which reheats precooked meals contained in the trays to a temperature suitable for serving. The geometry of the carton and the distribution of openings in the walls thereof is such as to facilitate the entry of heated air through these openings and its circulation throughout the interior of the carton in spaces between the trays whereby the meals in all of the trays are raised in temperature at substantially the same rate and all of the meals are in condition to be served at about the same time.

6 Claims, 9 Drawing Figures

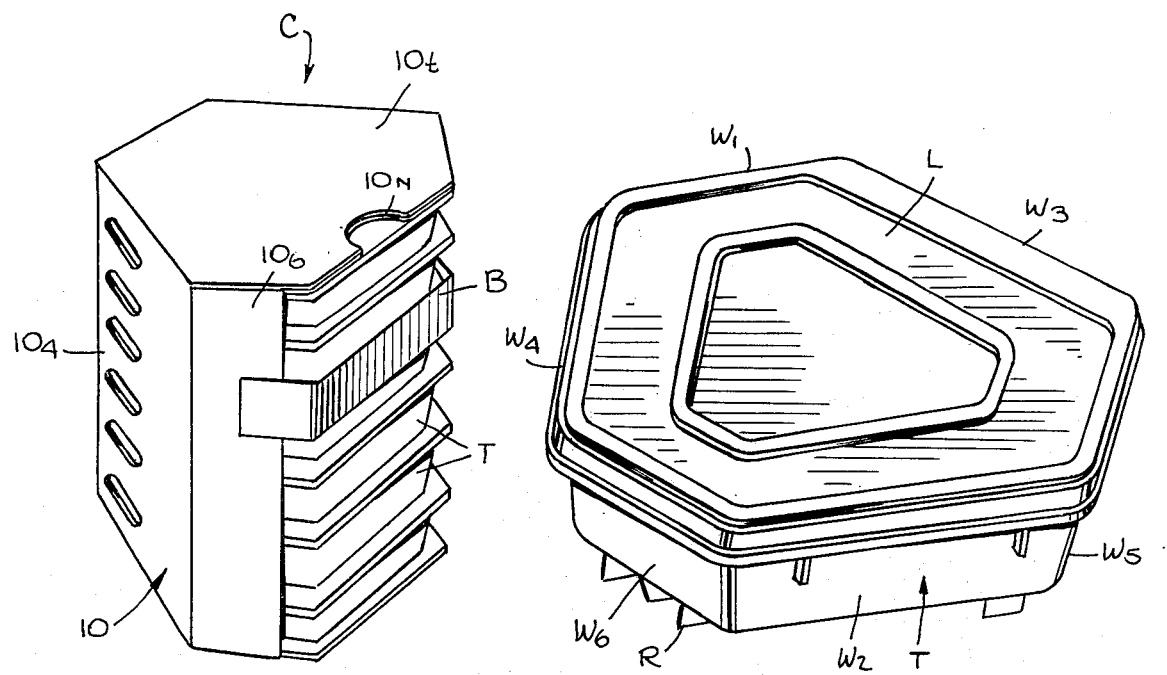
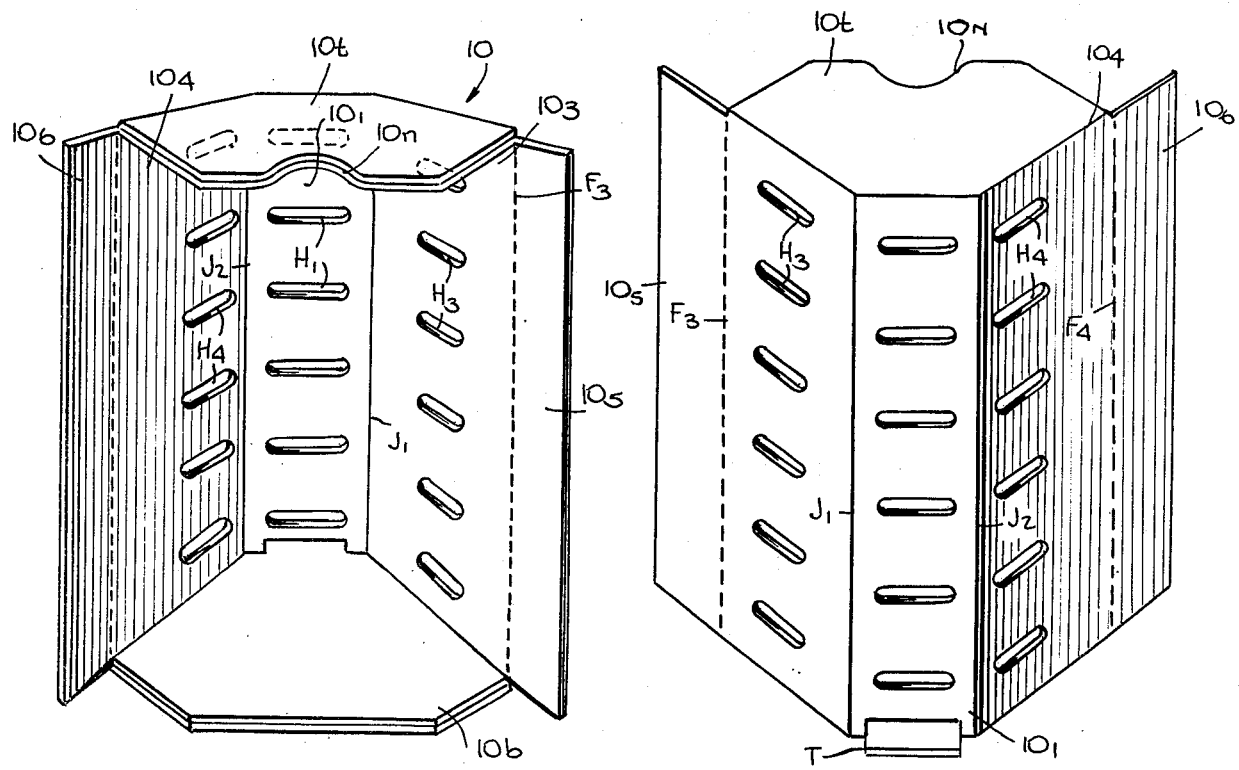

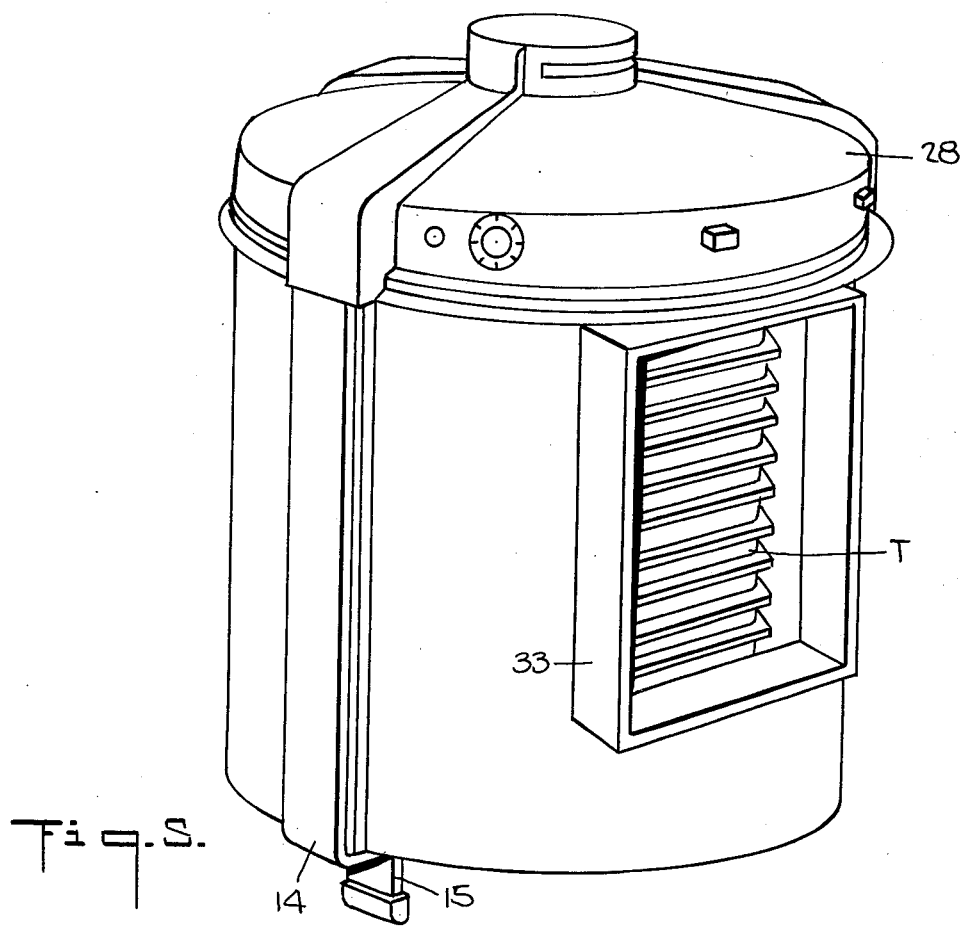
Fig. 5.
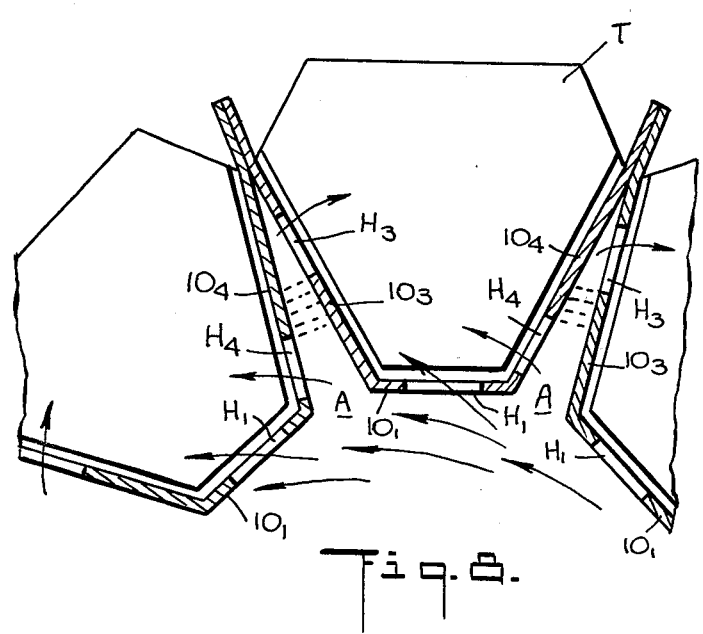
Fig. 8.
Fig. 9.

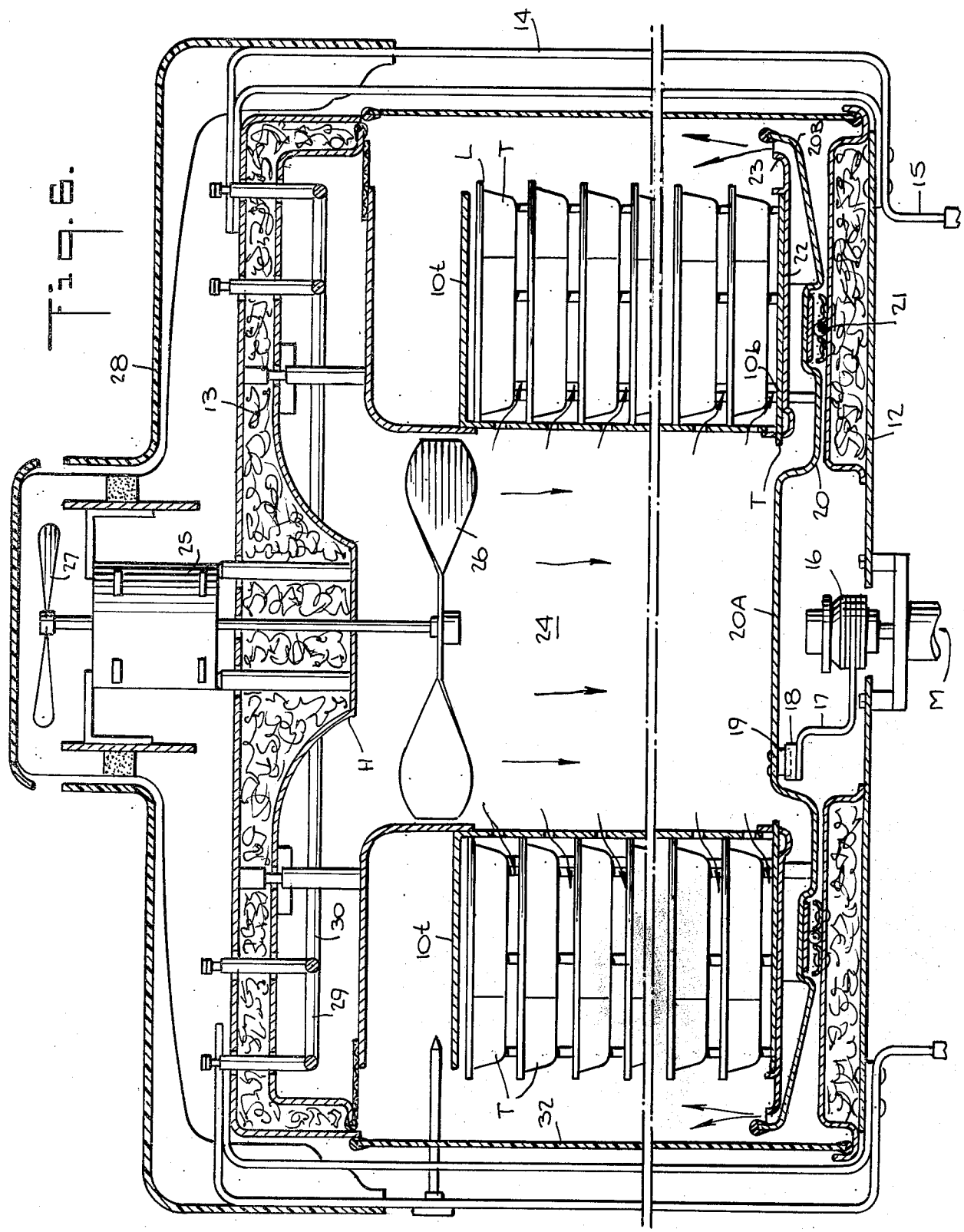

CARTRIDGE FOR HOT AIR OVEN

RELATED APPLICATION

This application is a continuation-in-part of my co-pending application Ser. No. 776,772 filed Mar. 11, 1977 whose entire disclosure is incorporated herein by reference.

BACKGROUND OF INVENTION

This invention relates generally to a cartridge formed by a stack of sealed trays nested within an open carton, the cartridge being usable in conjunction with a hot air oven functioning to quickly reheat pre-cooked meals contained in the trays, and more particularly to a carton whose geometry and whose distribution of wall openings are such as to facilitate the entry of heated air and its circulation throughout the interior of the carton in the spaces between the trays.

A major factor which militates against the success of self-service fast food techniques for pre-cooked meals is that the food to be reheated is necessarily placed in a closed heating chamber which must be opened to obtain access to the product. In a mass-feeding operation in which a large number of heated meals must be stored in readiness for withdrawal by diners, this involves a complicated multi-compartment structure, each with a separate door that must be opened to remove the meal and then closed.

In my above-identified copending application, there is disclosed a fast food service technique and apparatus therefor whereby pre-cooked meals which have been refrigerated may thereafter be reheated and made directly available to customers without degrading the essential texture, flavor or nutritional qualities of the meal. For this purpose, use is made of a hot air oven for heating tray-loaded cartridges, each constituted by a stack of sealed trays containing pre-cooked meals nested within an open carton whose side walls have holes therein to admit heated air. The oven includes a rotating turntable provided with a raised annular shelf for supporting an annular array of cartridges whose carton walls define a hollow center core. A driven propeller is disposed within the core, the space between the shelf and the turntable forming a restricted flow passage whose inlet communicates with the core and whose outlet lies at the periphery of the turntable In this hot air oven, a heater assembly above the annular cartridge array produces heated air which is blown by the propeller into the hollow core. Because of the flow restriction, there is a pressure build-up within the core and a substantial portion of the heated air is forced through the holes of the cartons to heat the pre-cooked meals in the trays. The remaining portion of the heated air passes through the flow restriction, the air discharged from the outlet thereof being directed upwardly to create an air curtain around the cartridge array, the air then being recirculated. Thus a toroidal flow pattern of heated air fully envelops the heated trays and serves to isolate the trays from the relatively cool ambient air without, however, interfering with direct access to the trays which may be withdrawn from the cartons when the food is at the desired temperature level for service to diners.

In the fast food technique disclosed in my copending application, the trays, when not in the oven, are kept under refrigeration at a temperature just above the freezing point of the pre-cooked food which, in practice, may be in a range of about 20° F. to 30° F.; for when the moisture content of the food is rich in dissolved salts, the freezing point may be well below 32° F. It is vital that the refrigeration, while close to freezing, not fall below the freezing point; for the formation of destructive ice crystals in the food must be avoided. It is also important to seal the trays to avoid the loss of moisture and volatile constituents.

If, therefore, the cartridges containing the trays have just been removed from the refrigerator before being placed in the hot-air oven, the oven must be capable of raising the food from, say 30° F. to 150° F. within a relatively short period so that the pre-cooked meals in all of the trays are then ready to be served. For this purpose, it is essential that the heating process be carried out in a manner whereby all trays are simultaneously raised in temperature at substantially the same rate, for otherwise the food in some trays may become overheated and others will be at a temperature below their proper service temperature.

SUMMARY OF THE INVENTION

In view of the foregoing, it is the main object of this invention to provide a cartridge formed by a vertical stack of sealed trays containing pre-cooked meals nested within an open carton for use in conjunction with a hot air oven serving to reheat the food, the geometry of the carton and the distribution of wall openings therein being such as to facilitate the entry of heated air through these openings and its circulation throughout the interior of the carton in the spaces between and surrounding the trays, whereby the meals in the trays are raised in temperature at substantially the same rate, and all of the meals are in condition to be served at about the same time.

More particularly, it is an object of the invention to provide a cartridge in which the open carton for nesting the trays has a trough-like configuration that includes a rear wall and a pair of angled side walls whereby when cartridges are placed within the oven in an annular array to define a hollow core through which heated air is blown, the side walls of the cartons in the array define triangular alcoves which communicate with the core, the pattern of holes in the carton walls being such as to entrain the heated air.

Also an object of the invention is to provide a carton of the above type which includes a rear tail insertable in a shelf slot, the tail serving to hold the carton in place even when it is empty of trays.

Still another object of this invention is to provide a carton for accommodating trays having a hexagonal configuration constituted by a short rear wall, a long front wall and a pair of long side walls adjoining the long front wall, the trays being nested within the carton so that their rear walls and their long side walls lie adjacent the corresponding carton walls.

A significant feature of the invention is that the carton is further provided with flaps extending from the side walls thereof which are foldable against the short side walls of the trays and are bridged by rupturable band bridging flaps, the trays thereby being retained in the carton. Removal of the trays from the carton is prevented until the band is ruptured to release the flaps.

Briefly stated, these objects are attained in a cartridge constituted by a vertical stack of sealed trays containing pre-cooked meals nested within an open carton having a trough-like configuration that includes a short rear wall and a pair of angled long side walls whereby when a group of such cartridges is placed in an annular array on a rotating shelf within a hot-air oven, a hollow central core is defined through which heated air is blown to create a swirling flow pattern, adjacent carton side walls of the array forming triangular alcoves communicating with the core.

The rear wall of the carton is provided with a vertical row of openings that are centered thereon, the first side wall of the carton having a corresponding row of openings adjacent its juncture with the rear wall, the second side wall of the carton having a corresponding row of openings adjacent the apex of the alcove. Thus the rear wall and the first side wall which lie in the path of the swirling air pattern have their openings placed where the dynamic pressure within the core is greatest, thereby forcing heated air into the interior of the carton through these walls at all levels therein, whereas the second side wall has its openings where the static pressure produced within the alcove is greatest to force air therethrough at all levels, as a consequence of which heated air is injected into the interior of the carton through all three walls thereof.

The sealed trays are formed with an outwardly-extending flange and with bottom ribs or spacers whereby when the trays are stacked one above the other within the carton, there are spaces between and surrounding the trays, the air injected into the carton wall openings circulating through these spaces to raise the temperature of the pre-cooked meals contained in the trays at substantially the same rate. Thus all of the meals are in condition to be served at about the same time.

The heated air circulation pattern created by the openings is such as to subject each tray in the vertical stack to heated air. However, as trays are removed from the carton for service to customers, the remaining trays continue without disruption to be heated, this action continuing even with a single tray left in the carton. However, since the cartons of the annular array of cartridges define the central core of the oven, these cartons, even when empty, must remain in the oven in order for the oven to operate properly.

BRIEF OUTLINE OF DRAWINGS

For a better understanding of the invention as well as other objects and further features thereof, reference is made to the following detailed description to be read in conjunction with the accompanying drawings, wherein:

FIG. 1 is a perspective view of a cartridge in accordance with the invention, the cartridge being constituted by a stack of trays nested within a carton, and trays containing pre-cooked meals to be heated in a hot air oven;

FIG. 2 is a perspective view of one of these trays;

FIG. 3 is a front perspective view of the carton;

FIG. 4 is a rear perspective view of the carton;

FIG. 5 is a perspective view of the hot-air oven;

FIG. 6 is a longitudinal section taken through the oven;

Figure 7:
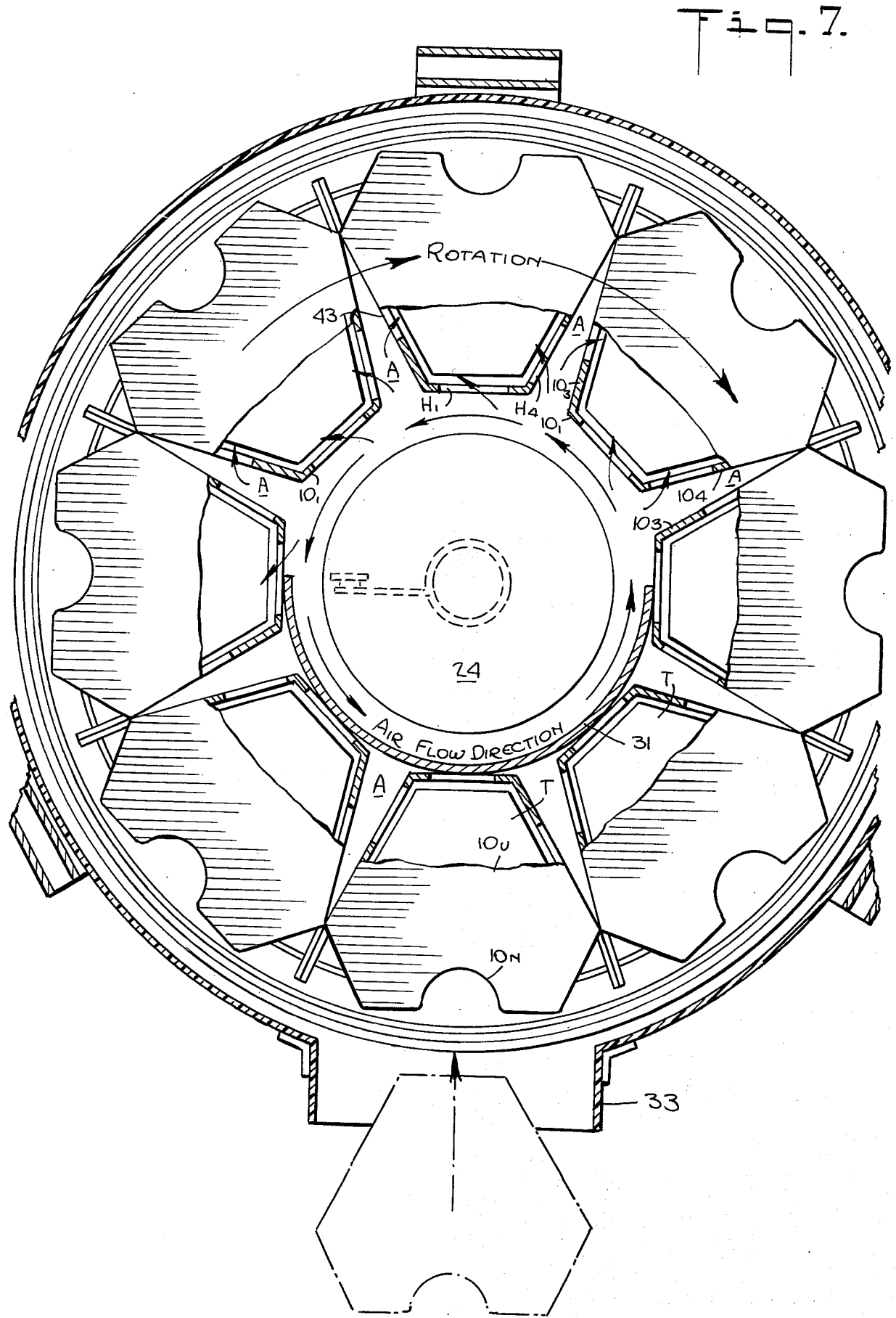
FIG. 7 is a transverse section taken through the oven.

FIG. 8 schematically shows the relationship between the swirling heated air in the oven core and the carton walls defining this core; and FIG. 9 schematically shows the flow distribution of heated air injected into a carton.

DESCRIPTION OF INVENTION

The Cartridge

Referring now to FIG. 1 showing a cartridge C in accordance with the invention, it will be seen that the cartridge is constituted by a vertical stack of like trays T nested within a carton 10. Trays 10 contain pre-cooked meals which are stored above the freezing point when the cartridge is refrigerated and which are raised in temperature to a service temperature level when the cartridge is heated in a hot-air oven in the manner to be later-described.

Each tray T, as shown in FIG. 2, has a hexagonal configuration whose sides are constituted by a short rear wall $W_1$, a longer front wall $W_2$, a pair of long side walls $W_3$ and $W_4$ adjoining the rear wall, and a pair of short side walls $W_5$ and $W_6$ adjoining front wall $W_2$. Running along the upper edges of these walls and the corners formed thereby is a continuous, outwardly-extending flange which surrounds the open mouth of the tray. The lid L covering the tray is provided with a downwardly-extending flange, the lid serving to seal the pre-cooked meal against the loss of moisture and other volatile constituents.

Projecting below the bottom of the tray are ridges R or other spacer means, whereby when the trays are vertically stacked within the carton, air circulation spaces are created between the stacked trays. Because of the tray flanges, there are air circulation spaces between the trays and the corresponding walls of the carton (see FIG. 9). A more detailed disclosure of the tray and lid is found in my copending application Ser. No. 785,527, filed Apr. 7, 1977, entitled "Tray and Lid Assembly."

Carton 10, as shown in FIGS. 3 and 4, has a trough-like configuration defined by a short rear wall $10_1$ and a pair of angled long side walls $10_3$ and $10_4$, these walls corresponding to sides $W_1$, $W_3$ and $W_4$ of the stack of trays nested within the carton. The carton is also provided with a top end wall $10_t$ and a bottom end wall $10_b$ whose geometry matches that of the trays, the top end wall having a notch $10_n$ therein to facilitate removal of the trays from the carton.

Rear wall $10_1$ is provided with a vertical row of elongated openings $H_1$ which are centered on this wall. The first side wall $10_3$ is provided with a corresponding row of openings $H_3$ which are off-center thereon, openings $H_3$ being closer to the perforated fold line $F_3$ than to the junction fold $J_1$ between rear wall $10_1$ and side wall $10_3$. The second side wall $10_4$ is provided with a corresponding row of openings $H_4$ which are off-center thereon, these openings being adjacent the junction fold $J_2$ between rear wall $10_1$ and side wall $10_4$.

Extending from side wall $10_3$ is a short flap $10_5$ which is foldable along perforated fold line $F_3$. Similarly provided on side wall $10_4$ is a short flap $10_6$ which is foldable on perforated fold line $F_4$. As shown in FIG. 1, these flaps are folded against the short side walls $W_5$ and $W_6$ of the stack of trays and are bridged by a rupturable sealing band B which may be printed to identify the contents of the trays. Thus when the cartridge is sealed by the band, the trays are locked within the carton, making it possible to handle the cartridges without difficulty. The seal is broken only after the food in the oven has reached its service temperature, at which point the trays may be withdrawn from the carton.

Projecting from the base of the rear wall is a tail T which is insertable in a slot (to be later described) in the shelf on which the cartridge is supported, the tail serving to hold the relatively light carton in place even when all trays are removed therefrom. Inasmuch as the carton is subjected to air pressure forces, the tail is necessary to prevent the carton from being blown out of place.

The Hot Air Oven

Referring now to FIGS. 5, 6 and 7, there is shown an oven in accordance with the invention which is adapted to accommodate eight cartridges C of the type previously described and to raise the temperature of the food contents to a suitable service level in the range of about 150° to 170° F., and to then maintain this temperature with a minimal amount of heat loss. Thus the energy requirements for the oven are relatively low, even though the oven has a permanently open access port through which the selected food trays may be removed.

The oven includes a circular base 12 which is packed with thermal insulation and a circular roof 13, also packed with thermal insulation. The roof is supported above the base by three equi-spaced metal columns 14 formed by narrow strips of metal whose lower ends curve in under base 12 and then extend downwardly therefrom to form feet 15 which serve to raise base 12 above ground.

Supported below the center of base 12 is a small motor M whose shaft is coupled to a slip clutch 16. The output of clutch 16 is operatively coupled to an arm 17 having a pusher finger 18 at its end, the rotating finger engaging an abutment 19 on the underside of a turntable 20 to drive the turntable. Turntable 20 rides on bearings on bearings 21 seated on the upper face of base 12.

Shelf 22 is dimensioned to support a circular array of eight stock cartridges C. The side walls of the cartridge cartons, as best seen in FIG. 7, form the boundary of a hollow central core 24 extending vertically above hump 20A, the hollow core communicating with the inlet to restricted flow passage 23. The tail T of the cartons is inserted in a slot formed in shelf 22 to hold the cartons in place even when empty and to prevent the air pressure within the core from dislodging them. Alternatively, the shelf may be provided with a tab extension insertable in a slot in the carton rear wall.

Mounted centrally above roof 13 is a motor 25 having an armature shaft which extends downwardly through the roof and terminates in a main propeller 26 disposed within hollow core 24. Attached to the other end of the motor shaft is an auxiliary propeller 27 functioning as a cooling fan for the motor. Propeller 27 blows air into the region between roof 13 and a plastic dome 28 supported thereabove. The space between the dome and the roof serves to house the electrical controls associated with the oven and is ventilated by cooling air from the auxiliary propeller, the heat of the dome being vented.

Supported from roof 13 is a heater assembly having a high-wattage main section 29 and an intermediate wattage auxilliary section 30, the sections being installed in the open space between the upper end of the array of cartridges C and the overlying roof 13. The sections are formed by heater elements curved to define two concentric circles surrounding the hollow central core 24, each circle having a gap therein formed by the spaced input terminals to the heater section. Thus the air heated by sections 29 and 30 is blown into hollow core 24 by the main propeller 26 and is blown therethrough at high velocity to create a swirling flow pattern having a helical formation. Below the heater assembly is an inlet horn H, which is suspended from roof 13 by posts.

Because of the restricted flow passage 23, all of the heated air blown down the core cannot escape therethrough. As a result of the pressure build-up in the core, a substantial portion of the heated air is forced through holes $H_1$, $H_3$ and $H_4$ in the cartons defining the boundary of hollow core 24. It will be seen in FIG. 7 that this boundary is composed of the rear walls of the several cartons which are arranged in a circle, the breaks between these rear walls $10_1$ being bounded by side walls $10_3$ and $10_4$ which form triangular alcoves A. Thus the alcoves communicate with the core.

Thus the heated air is forced through the holes not only in the rear walls but also in the side walls of the cartons, the heated air penetrating the carton being distributed throughout the spaces between the trays stacked therein, thereby heating the food contents. A more detailed explanation of how the heated air in the core is forced through the openings in the carton walls is set forth in connection with FIGS. 8 and 9.

The portion of the heated air blown down hollow core 24 which is not forced through the array of cartridges to heat the trays flows into the orifice of the restricted flow passage 23 and emerges from the outlet thereof at the periphery of the turntable, from which outlet it is directed upwardly and then returned to the space occupied by the heater assembly, to be blown into the core for recirculation. The upwardly-directed air creates a cylindrical air curtain which surrounds the array of cartridges.

Thus the flow pattern of heated air produced within the oven creates a toroidal loop which fully envelops the circular array of cartridges therein to isolate the heated trays from the cooler ambient air and to minimize heat losses. In order to conserve space, the air curtain is arranged to directly surround the cartridge array and consequently is subject to disruptive impingement by air passing laterally through the trays. The air curtain is therefore surrounded by a cylindrical thermal barrier 32. Mounted on thermal barrier 32 at the front of the oven is a rectangular access port 33 which is large enough to permit cartridges C to be manually inserted therein and loaded on the turntable shelf.

In order to realize a two-zone heating operation, placed vertically within hollow core 24 of the oven is an arcuate shield 31. This shield conforms to the boundary of the core and acts to confine the flow of hot air into the cartridges carried on the turntable to the rear sector of the oven interior, thereby minimizing the escape of air through access port 33 in the front sector of the oven.

Mainly by reason of shield 31 and to a lesser extent because of the gaps in the concentric heater sections 29 and 30, the rear sector of the oven becomes substantially hotter than the front sector thereof. Hence the shield effectively divides the oven into a front hot zone which includes access port 33, and a rear extra-hot zone. During each cycle of rotation, trays T in the cartridges traverse the hot zone and then the extra hot zone in the manner described in my copending application.

Heated Air Flow Pattern

Referring now to FIGS. 8 and 9, we shall explain why cartridges C, when placed in the oven in an annular array to define a central core 24 into which heated air is blown at high velocity, create pressure forces causing heated air to be injected into openings $H_1$, $H_3$ and $H_4$ in the rear walls $10_1$ and side walls $H_3$ and $H_4$ of the cartons. The arrangement is such as to cause the injected air to be circulated throughout the interior of each carton 10 in the array to rapidly transfer heat to pre-cooked meals in trays T nested therein at substantially the same rate, so that all trays reach their service temperature at about the same time.

The boundary of core 24 is defined by the rear walls $10_1$ in the annular array of cartons 10. Because of the hexagonal geometry of the trays, side walls $10_3$ and $10_4$ of adjacent cartons in the array form triangular alcove A communicating with the core. Openings $H_1$ in the rear walls of the cartons are centered on these walls, while openings $H_4$ on side wall $10_4$ lie adjacent the junction of this wall and the rear wall, whereas openings $H_3$ are closer to the apex of the triangular alcove A.

The swirling flow of heated air within core 24 is indicated by the arrows. Because the air is blown down the core by a propeller, the flow pattern has a helical or screw formation. And because of the flow restriction, which resists the discharge of air from the core, there is a pressure build-up therein. The total pressure within the core is the aggregate of dynamic and static pressure forces.

Openings $H_1$ in rear walls $10_1$ of the cartons and openings $H_4$ in side walls $10_4$ lie directly in the path of the swirling fluid. Hence these openings are subjected primarily to dynamic pressure forces, the heated air thereby penetrating the interior of the cartons through rear wall $10_1$ and side wall $10_4$. Openings $H_3$ in side walls $10_3$ are closer to the apex of the alcoves and are therefore removed from the direct path of the swirling fluid. However, the static pressure developed in these alcoves produces the necessary force to inject heated air into the cartons through openings $H_3$ of side wall $10_3$.

Thus heated air is forced through the openings in the rear and side walls of the cartons. As best seen in FIG. 9, these openings, which lie in a vertical row, are positioned so as to introduce the heated air into the circulation spaces formed between the trays in the stack. Since the air flow pattern in the core produced by the rotating propeller is helical and the fluid, therefore, has a downward pitch, the series of openings in the row are somewhat above the corresponding series of spaces between the trays in the stack, so that the heated air is injected into these spaces and do not strike the walls of the trays. In practice, the upper end 10 of the carton may be provided with openings to admit heated air for the uppermost tray in the stack, or a space may be provided between this upper end and the lid of the top tray into which heated air is admitted through openings in the carton walls.

In this way, the heated air, which is injected into the cartons because of the dynamic and static pressures produced within the core, is so distributed as to circulate uniformly throughout all of the trays and thereby heat up the precooked meals rapidly at about the same rate.

It is important to note that the cartridges, when installed within the hot-air oven, act to define the central core therein through which heated air is blown by the propeller, the cartridges in this phase of the fast food service technique in accordance with the invention serving as an essential component of the oven. But this is only the final function of the cartridges, for each tray-loaded cartridge constitutes the original package for the pre-cooked meals. This original package serves to facilitate the refrigeration of the pre-cooked meals as well as providing means by which packaged meals can be transported in large containers to a customer-dispensing station where the packages then go into the hot-air oven. Once the meals are cooked and placed into the sealed trays, they are never exposed in subsequent processing, and the pre-cooked meals are therefore protected from contamination.

Moreover, the carton in which the trays are nested is preferably fabricated of low-cost, corrugated paper board and is disposable. Hence when all trays have been withdrawn from all cartons in the oven, one may then simply discard the empty cartons, thereby avoiding clean-up problems of the type encountered with an oven having interior shelves or other fixtures therein to accommodate food trays. As long as the oven is in operation, one cannot remove an empty cartons, for the cartons define the operating core of the oven. The interior of the oven, in the absence of cartridges, is an uncluttered space and there is nothing therein requiring cleaning.

In refrigerating the food-loaded cartridges, use may be made of a cold fluid machine whose essential structure and operation are comparable to that of the hot-air oven disclosed herein, the main difference residing in the use of a cold fluid source rather than heated air. The cold fluid is blown down the central core and injected through the holes in the carton walls to cool the food in the trays, a cold fluid curtain surrounding the array of cartridges to isolate the trays from the warmer ambient air.

While there has been shown and described a preferred embodiment of a cartridge for hot air oven in accordance with the invention, it will be appreciated that many changes and modifications may be made therein without, however, departing from the essential spirit thereof.

I claim:
1. A cartridge usable in conjunction with a hot air oven wherein heated air is blown through a hollow cylindrical core formed by an annular array of such cartridges to create a swirling flow pattern therein, said cartridge comprising:
   A. a vertical stack of trays containing pre-cooked meals, said trays having a hexagonal geometry formed by three back sides and three front sides, said trays having spacers to produce circulation spaces therebetween in the stack; and
   B. a carton nesting the stack of trays and having a rear wall and first and second inclined side walls corresponding to the three back sides of said hexagonal trays, whereby said carton is open on the front three sides of said trays, the rear walls of the cartons in the array of cartridges defining the cylindrical boundary of said core, the first and second side walls of the cartons defining triangular alcoves which communicate with and project outwardly from said core;
   C. said rear wall and said first and second side walls of said carton having vertical rows of openings at corresponding levels, the openings in said rear wall lying in the path of said swirling flow pattern, the openings in said first side wall being adjacent the junction of this wall and the rear wall and also lying in said path, the openings in the second rear wall being adjacent the apex of the triangular alcove formed thereby and lying outside of said path, whereby heated air is injected into said rear wall and first side wall openings as a result of dynamic pressure forces produced by the swirling flow pattern, and is injected into said second side wall openings as a result of static pressure developed in said alcoves.

2. A cartridge as set forth in claim 1, wherein said openings are horizontally elongated.

3. A cartridge as set forth in claim 1, wherein the openings in the rear wall are centered thereon.

4. A cartridge as set forth in claim 1, wherein said row openings are positioned to inject heated air into said spaces.

5. A cartridge as set forth in claim, wherein said trays are provided with flanges to provide circulation spaces between said carton walls and said trays.

6. A cartridge as set forth in claim 1, wherein said first and second side walls are provided with flap extensions which are foldable against corresponding sides of said trays, and a rupturable band bridging said flap extensions to lock said trays in said cartridge.

* * * * *

UNITED STATES PATENT OFFICE
CERTIFICATE OF CORRECTION

Patent No. 4,269,169            Dated May 26, 1981

Inventor(s) Raul Guibert

It is certified that error appears in the above-identified patent and that said Letters Patent are hereby corrected as shown below:

Claim 5, "claim," should have read -- claim 1, --

Signed and Sealed this

First Day of September 1981

[SEAL]

Attest:

Attesting Officer

GERALD J. MOSSINGHOFF

Commissioner of Patents and Trademarks